Sept. 26, 1933.   D. McEWAN   1,928,025
ASTRONOMICAL APPLIANCE FOR EDUCATIONAL AND OTHER PURPOSES
Filed April 5, 1932   2 Sheets-Sheet 2
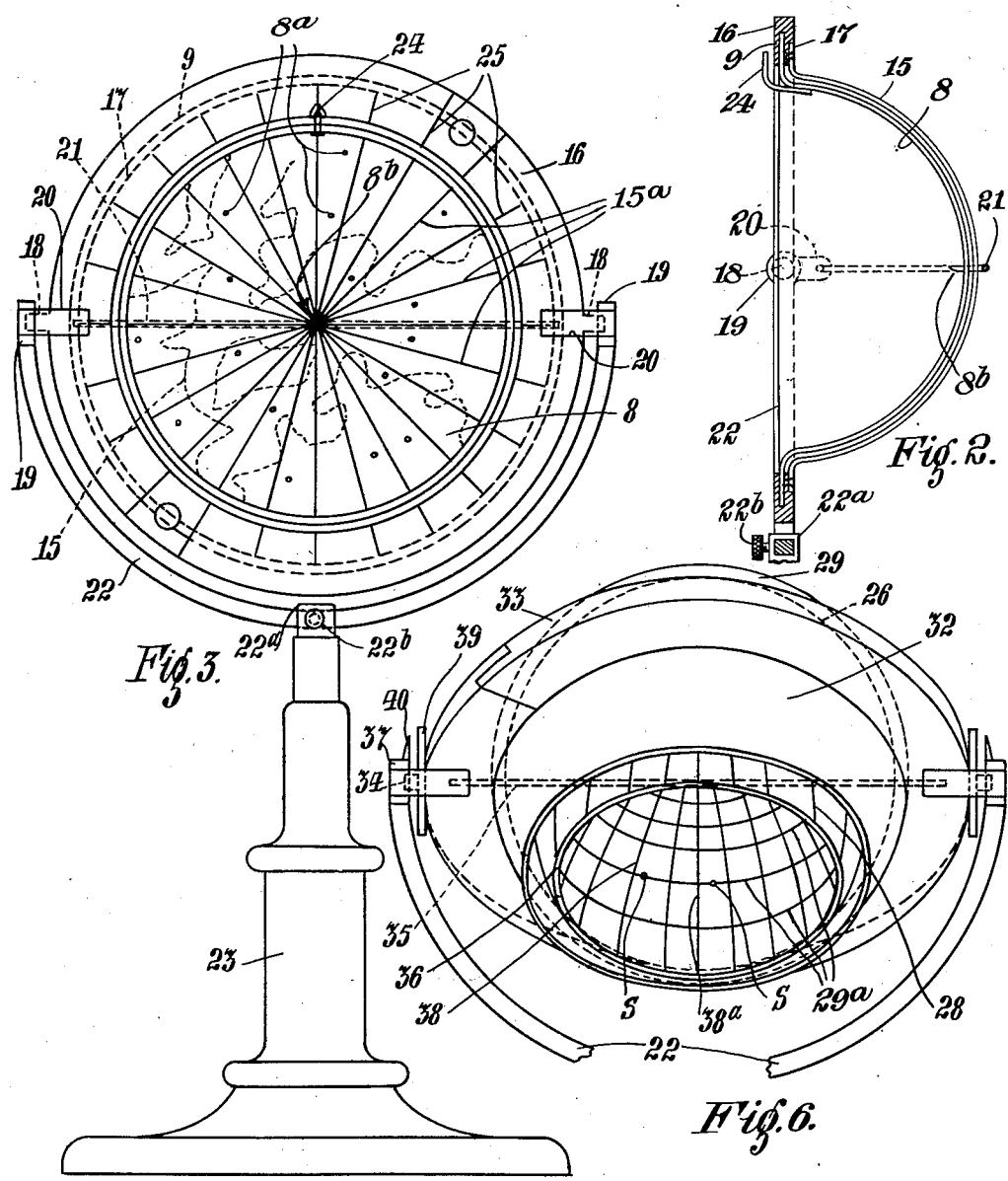

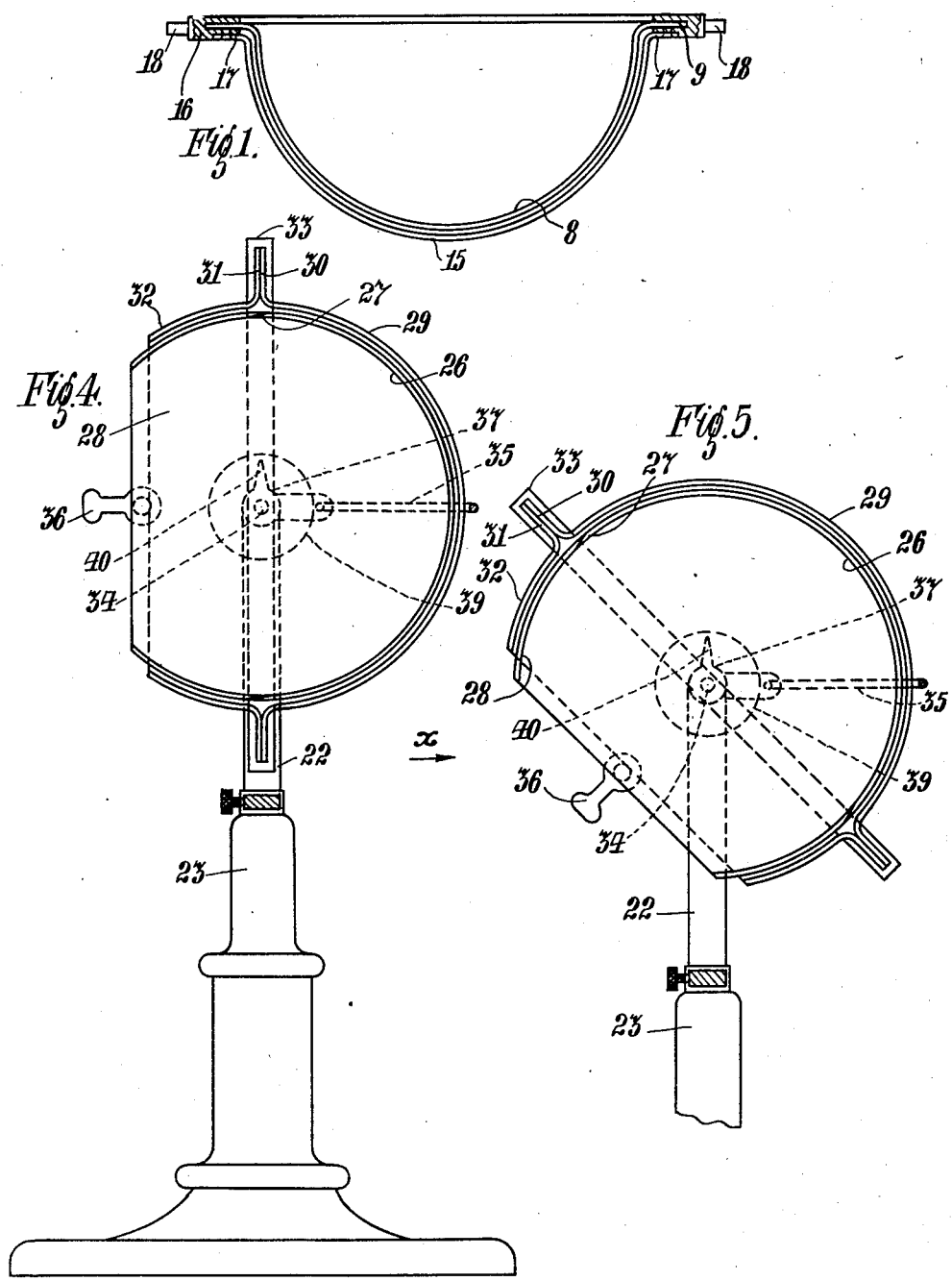

Patented Sept. 26, 1933

1,928,025

UNITED STATES PATENT OFFICE 1,928,025

ASTRONOMICAL APPLIANCE FOR EDUCATIONAL AND OTHER PURPOSES

Duncan McEwan, Renton, Scotland

Application April 5, 1932, Serial No. 603,282, and in Great Britain September 17, 1931

4 Claims. (Cl. 35—5)

This invention relates to appliances in which astronomical and geographical charts concentrically arranged within one another are used for teaching astronomy, navigation or geography, and which may also be used for navigational purposes or by travellers, explorers, army officers and others when taking observations of the stars or when requiring to ascertain a position on the earth's surface.

The object of the present invention is to improve the construction of such appliances.

According to the invention, I provide appliances of the type stated which comprise two or more stellar and geographical charts made from celluloid, cellostoid, cellophane or like transparent or translucent material moulded or shaped so that the charts can be concentrically arranged in a manner allowing them to be adjustable relative to one another.

Preferably, the arrangement of the stellar and geographical charts is such that each chart, in addition to being adjustable relatively to the other or others, is adjustable relatively to a member or members constituting an artificial horizon.

In constructing appliances of the type stated, with transparent or translucent charts as thus moulded, I generally mark or perforate one chart so as to represent the stellar semi-universe and another chart so as to represent the geographical features of the earth, these two charts being arranged concentrically within each other, either the geographical or the stellar chart being arranged innermost.

Whilst in the foregoing, reference has been made to charts of hemispherical shape, I may provide celluloid or like charts in the shape of any other segment of a hollow sphere, this being done by joining two or more moulded parts together by an adhesive, by metallic connections or otherwise. In this case, the inner chart may be universally adjustable within the outer chart, being retained in the outer chart by reason of the same extending over its surface to an extent greater than one complete hemisphere.

In order to make adjustment of the stellar and geographical charts relatively to each other possible, any suitable rotative and/or pivotal bearing may be employed. For example, where a stellar chart is arranged concentrically with a geographical chart, inter-engaging parts may be provided on the charts so that they are relatively rotatable in order that the position of the stars at different hours in relation to different parts of the earth may be represented on the charts and studied by an observer looking into the interior or upon the exterior of the charts. Moreover, in order that the position of the stars at different latitudes may be represented by the charts, the same are rotatable about a horizontal diametrical axis, so that the charts can be angularly adjusted relatively to the member or element representing the horizon. For this purpose, the horizontal diametrical axis of the charts is constituted by pivots provided on the outermost of the interengaging rings on the charts, the said pivots being supported by fixed bearings carried by a stand.

Instead of providing the inner chart with a ring rotatable in another ring carried by the outer chart, as in the construction described above, the outer chart, or each of the charts, may be in the form of a spherical segment greater than a hemisphere, the outer chart, or each chart, being constituted, for example, of a complete hemispherical segment connected with a hollow part hemispherical segment. In the case of the outer chart, the two segments in this case may be connected by flanges riveted together, whilst in the case of the inner chart, the segments may be connected by a scarfed or lap joint secured by an adhesive or thin fasteners.

The flanges of the hemisphere and segment constituting the outer chart in this construction are arranged in a ring so that the outer chart, with the inner chart, is rotatable therein, the said ring being itself rotatable about pivots arranged in a horizontal axis so that the charts are together angularly adjustable with respect to a member or element constituting an artificial horizon.

The invention will now be described, by way of example, with reference to the annexed drawings, in which, Fig. 1 is a cross sectional view of the moulded outer chart with a bearing ring, pivotal supports and an element constituting an artificial horizon;

Fig. 2 is a vertical half section of the complete appliance including the inner and outer charts and their associated parts;

Fig. 3 is a front view of the chart shown in Fig. 2;

Fig. 4 is a vertical half section of a modified form of appliance;

Fig. 5 is a vertical sectional view of the modification shown in Fig. 4, the charts being adjusted for reading at a latitude of 45°;

Fig. 6 is a front view of the modification shown in Fig. 5 looking in the direction of the arrow $x$.

In practice, I prefer to arrange the steller chart outside the terrestial chart, but the appliances shown in the drawings have their terrestial chart outside the stellar chart. It will be appreciated that, as the two charts are a close fit within each other, the fact whether the stellar chart is outside or inside is not of paramount importance, but generally where the stellar chart is arranged on the outside it is desirable that the observer should view the charts from their inner side with the source of light illuminating the stars on the outside. Alternatively, if the stellar chart is arranged inside, the observer views the charts from the outside, the source of light being placed on the inside.

As shown in Fig. 1, the chart 8 is concentrically arranged within a hemispherical chart 15 of slightly larger radius, the flange 9 of the chart 8 being rotatably disposed in a grooved two-part bearing ring 16, to which is secured the flange 17 of the chart 15.

As will be seen from Fig. 2, the pivots 18 of the bearing ring 16 are supported in bearings 19. Inwardly projecting arms 20 are formed integral with the bearings 19 and carry a substantially semi-circular wire member 21 adapted to constitute an artificial horizon with respect to the chart 15. The bearings 19 are carried by a yoke 22 which is slidable in a bearing support 22a carried by a stand 23. The yoke 22 and bearing 22a enable the charts to be adjusted so that the axis of the pivots 18 lies at an angle to the horizontal, the yoke being secured in its adjusted position by a screw 22b.

From Fig. 3 it will be apparent that a fixed zero member 24 is provided on the inner chart 8, whilst graduations 25 corresponding to different hours of the day are marked on the bearing ring 16 carrying the outer chart 15.

In the drawings, the inner chart 8 represents the steller chart whilst the outer chart 15 represents the geographical chart.

The outer or geographical chart 15 as shown in Fig. 3 is divided into twenty four parts, denoting the twenty four hours of a day and night, by lines of longitude or meridians 15a, and may also be provided with parallels of latitude, as shown at 29a in the chart appliance hereinafter described with reference to Fig. 6. The configuration of the earth and sea of one of the hemispheres, say the northern hemisphere, is also indicated on the outer or geographical chart 15, appearing reversed when viewed from the inside of the said chart, as shown in Fig. 3, but normal when viewed from the exterior of the chart. Perforations 8a are formed in the inner or stellar chart 8 (see Fig. 3) so as to indicate the position of the stars at a particular hour in relation to that part of the earth shown on the outer or geographical chart 15. The pole star is represented by a perforation at 8b where the axis of the bearing ring 16 would pass through the chart.

A source of light (not shown) is arranged to shine towards the back of the appliance, so that the reversed configuration of the earth and sea are plainly visible to an observer stationed in front of the appliance and looking into the interior of the hemispherical chart 8. The light, shining through the perforations 8a and 8b makes these perforations appear to the observer as small points of light, representing the stars, superposed upon the geographical chart 15.

Referring to Fig. 4:—

The inner or stellar chart is constituted by a hemisphere 26 connected by an adhesive or fastening means at a scarf joint 27 to a hollow segment 28. The outer chart, on the other hand, is constituted by a flanged hemisphere 29 of which the flange 30 is connected by rivets or otherwise to a flange 31 formed on a hollow segment 32. As will be seen, the outer chart envelopes the inner chart to an extent greater than a complete hemisphere so that the inner chart 26, 28 is universally adjustable within the outer chart 29, 32 without the charts tending to separate. The jointed flanges 30, 31 are arranged in a bearing ring 33 so that the outer chart as a whole is rotatable with respect to the said ring 33. By means of pivots 34, also, the ring 33 is itself angularly adjustable with respect to a wire member 35 constituting an artificial horizon. A small hand grip 36 may be provided on the inner chart to facilitate its adjustment. The pivots 34 are supported by bearings 37 which, as in the modification first described, are carried by a yoke 22 and stand 23.

In order that the method of using the appliance may be clearly understood, reference will now be made to Figs. 5 and 6. It will be assumed that it is desired to observe the position of the stars visible to a person standing at a point 45° N. latitude and W. longitude and at twelve o'clock midnight, the inner and outer charts being assumed to be turned on the pivots 34 to correspond with this latitude, and the outer or geographical chart 29, 32 is set to a position corresponding to the said longitude, whilst the stellar or inner chart 26, 28 is set with its zenith or pole star in the heavens.

If the position of the star marked S in Fig. 6 is now noted it will be readily understood that the position of the said star with relation to its altitude above the horizon represented by the wire member 35, at twelve o'clock midnight, or at any hour before or after twelve midnight, can be readily determined by turning the outer or geographical chart 29, 32 in the bearing ring 33, the angle through which the chart is turned being read off directly on a scale of hours provided on the edge of the part 32 of the geographical chart and co-operating with an index mark on the adjacent edge of the stellar chart 28. If, however, it is desired to know which part of the earth or sea the star S will be directly over say at two hours after midnight, the operator has merely to turn the stellar chart 26, 28 about its axis from its position in Fig. 6 immediately to the right of a meridian 38 through two spaces, representing two hours, to a point at the same latitude but immediately to the right of the meridian 38a, the geographical chart 29, 32 in this case not being turned in the bearing ring 33.

It has been assumed in the foregoing that the latitude of the chosen standpoint on the earth's surface was 45° N. If, however, the latitude is changed to 60° N. the operator then simply turns the bearing ring 33 with the inner and outer charts so as to cause the whole arrangement to turn about the pivots 34 until the angle X, previously 45°, between the axis A, B of the charts and the horizon represented by the wire member 35, is altered to 60° and can be read directly off by the operator on a scale 39 rotatable with the bearing ring 33 and co-operating with a fixed index 40 on the fixed bearing supports 37.

The marking of the stellar and geographical charts may be carried out in any desired manner. For example, the lines of latitude and longitude may be marked on the charts by a needle point, and the same device may be used for the marking of geographical features on the geographical chart, the colourings of these features being obtained by the use of viscous inks or pigments. Preferably, perforations in the stellar chart to represent the stars are graded in size to correspond with the different sizes which the stars in the sky appear to have when viewed by an observer.

The invention is particularly adapted for use in teaching astronomy and navigation in schools, universities and other places. It is also equally well adapted for the teaching of geography, as the demonstrator has only to use the geographical outlines on the terrestial chart. The use of the true hemispherical chart simplifies teaching, because students are better able to understand the relation between the stars and the earth on a single hemispherical map than on a series of plane maps which involve the need for projection. The appliance also obviates the necessity for making elaborate mathematical calculations and is particularly useful for practically demonstrating to seamen the connection between the principles of astronomy and those of navigation.

I claim:—

1. A combined astonomical and geographical chart appliance comprising a part-spherical stellar chart made of light-penetrable material and having represented thereon the stars in the celectial hemisphere as viewed at a particular hour in a chosen latitude and longitude, and a part-spherical geographical chart made of light-penetrable material and representing a map of part of the earth corresponding to said celestial hemisphere, the charts being arranged one within the other so that by manipulation thereof the position of the stars in relation to the earth's surface can for the point of terriestial latitude and longitude chosen for demonstration and for any hour of day or night be shown on the charts and accurately determined without calculation.

2. A combined astronomical and geographical chart appliance comprising a part-spherical stellar chart made of transparent material and having holes therein representing the stars in the celestial hemisphere as viewed at a particular hour in a chosen latitude and longitude, a part-spherical geographical chart made of transparent material and representing a map of part of the earth corresponding to said celestial hemisphere, the charts being arranged one within the other so that by manipulation thereof the position of said stars in relation to the earth's surface can be shown on the charts for the chosen point of terrestial latitude and longitude.

3. A combined astronomical and geographical chart appliance comprising a part-spherical stellar chart made of translucent material and having represented thereon the stars in the celestial hemisphere as viewed at a particular hour in a chosen latitude and longitude, a part-spherical geographical chart made of translucent material and representing a map of part of the earth corresponding to said celestial hemisphere, a partially hoop-shaped element constituting an artificial horizon, and means whereby said charts are together angularly adjustable with respect to said horizon element, one chart being arranged within the other so that by manipulation thereof the position of the stars in relation to the earth's surface can be shown for any hour for the chosen point of terrestial latitude and longitude.

4. A combined astronomical and geographical chart appliance comprising a part-spherical stellar chart made of celluloid and having holes therein graded in size and arranged to represent the stars in the celestial hemisphere as viewed at a particular hour in a chosen latitude and longitude, a part-spherical geographical chart made of celluloid and having markings and colourations thereon representing a map of the earth corresponding to said celestial hemisphere, the charts being arranged one within the other so that by manipulation thereof the position of the stars in relation to the earth's surface can be shown on the charts for any hour for the chosen point of terrestial latitude and longitude.

DUNCAN McEWAN.